A. LAMBERT.
DRUM, SHAFT, AND WINCH FOR HOISTERS.
APPLICATION FILED APR. 29, 1915.
1,181,323.
Patented May 2, 1916.
2 SHEETS—SHEET 1.
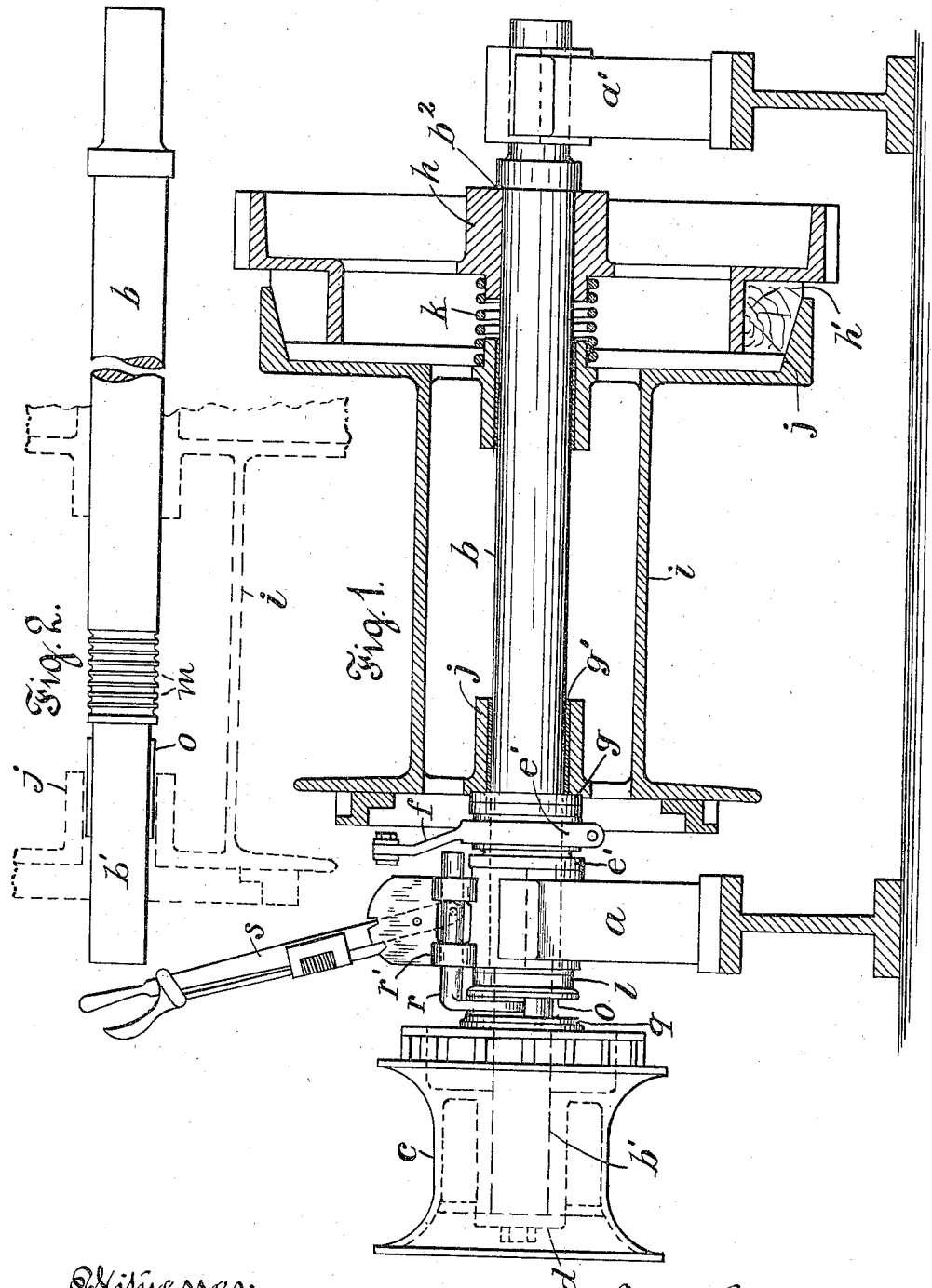

A. LAMBERT.
DRUM, SHAFT, AND WINCH FOR HOISTERS.
APPLICATION FILED APR. 29, 1915.
1,181,323.
Patented May 2, 1916.
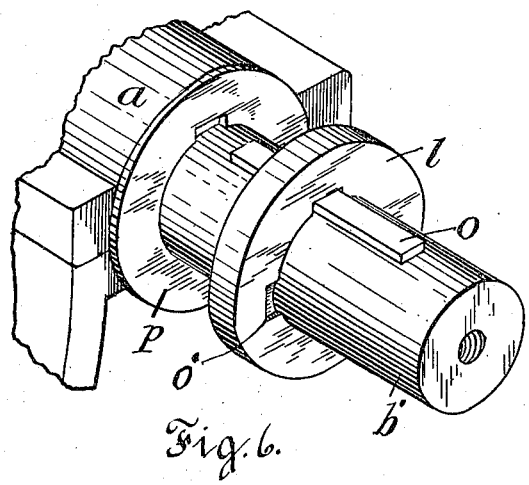
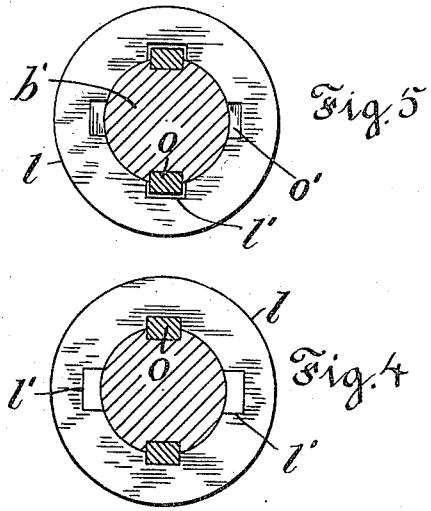
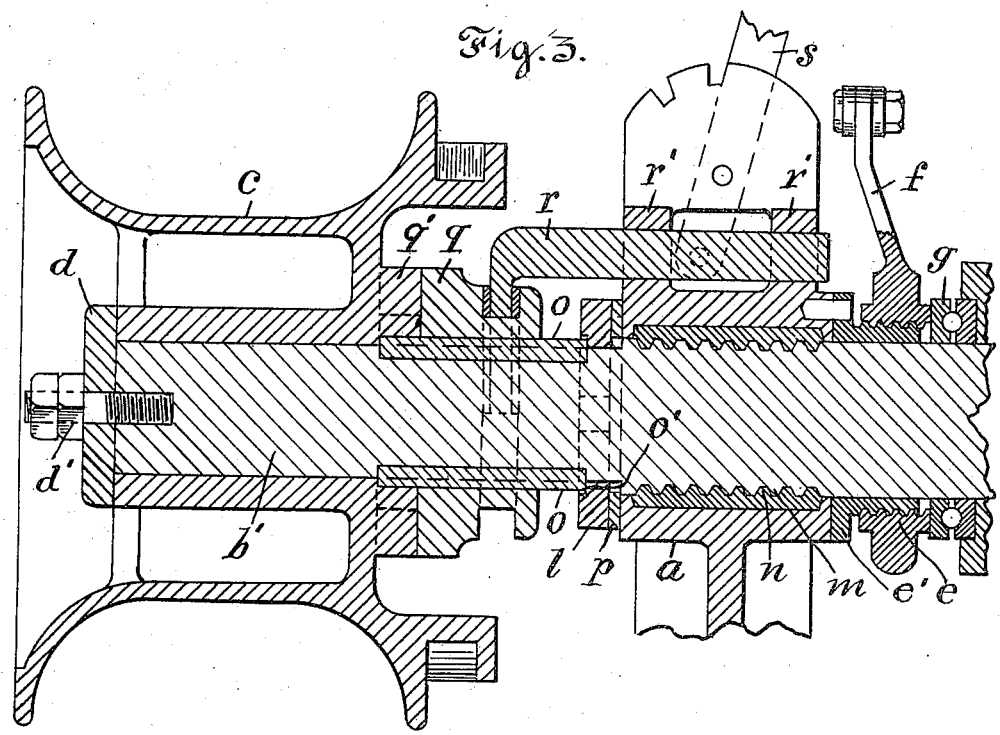

UNITED STATES PATENT OFFICE.

ASHER LAMBERT, OF NEWARK, NEW JERSEY.

DRUM, SHAFT, AND WINCH FOR HOISTERS.

1,181,323.  Specification of Letters Patent.  Patented May 2, 1916.

Application filed April 29, 1915. Serial No. 24,684.

*To all whom it may concern:*

Be it known that I, ASHER LAMBERT, a citizen of the United States, residing at 1 Johnson avenue, Newark, county of Essex, and State of New Jersey, have invented certain new and useful Improvements in Drums, Shafts, and Winches for Hoisters, fully described and represented in the following specification and the accompanying drawings, forming a part of the same.

This invention relates to a hoister in which a drum-shaft is mounted in bearings upon a frame, a friction-driver fitted to a shoulder upon the said shaft near one of the bearings, a drum fitted to turn upon the shaft between such friction-driver and the opposite bearing, and means abutting upon the opposite bearing to force the drum toward the friction-driver. In hoisters having such a construction, it is sometimes necessary to project the end of the shaft beyond one of the bearings and to fit a winch rotatably thereon, with a clutch-collar between the winch and the bearing to engage the winch, when required, to rotate it.

Heretofore, it has been common to resist the thrust upon the bearing next the winch by a thrust-collar applied to the shaft outside of such bearing and held in place by the two ends of feathers recessed in the shaft to drive the clutch of the winch. In such prior constructions, the bore of the winch has often been made the same as the bore of the drum, so that neither the thrust-collar nor the drum could be slipped endwise from the shaft without first removing the feathers, which is a very laborious task if they are fitted firmly in the shaft. By the present invention, such removal of the feathers to draw the thrust-collar from the shaft so that the drum can be removed, is avoided by a special construction of the thrust-collar itself; by which it is formed with notches adapted to clear the feathers so that the collar may be slipped over the same when its removal is required, but it is also adapted to be locked securely in its working position by means of shallow recesses formed to engage the ends of the feathers when in its working position in contact with the outer end of the bearing.

The invention also provides a two-fold means for resisting the thrust upon the bearing, consisting of the thrust-collar upon the outer side of the bearing and grooves formed in the shaft with corresponding ribs and grooves in the bearing.

The invention will be understood by reference to the annexed drawing, in which—

Figure 1 is an elevation partly in section, where hatched, of the drum-shaft with the drum and winch fitted thereto; Fig. 2 is a side view of the shaft with the drum shown in dotted lines partly slipped from its normal position, to remove it from the shaft over the feathers upon the extension; Fig. 3 shows the bearing, the drum, and clutch-shifter upon a larger scale; Fig. 4 shows a section of the shaft with the thrust-collar in its working position thereon; Fig. 5 is a section of the shaft with the thrust-collar turned ninety degrees for the notches to slip over the feathers; and Fig. 6 is a perspective view of the face of the bearing with the overhung extension of the shaft and the thrust-collar partly removed over the feathers.

$a, a'$ designate the bearings of the drum-shaft $b$ which may have winches upon one or both ends.

The shaft is formed with extension $b'$ overhung from the bearing $a$, and a winch $c$ mounted thereon and held thereon by a disk or plate $d$ and bolt $d'$.

The shaft is formed near the bearing $a'$ with a shoulder $b^2$ against which the hub $h$ of a gear and friction-driver $h'$ is fitted. A drum $i$ is provided with a hollow cone $j$ to fit the friction-driver, and is forced toward the same when the drum is to be rotated by a threaded sleeve $e$ mounted upon a threaded hub $e'$ which is fitted loosely to the shaft upon the inner side of the bearing $a$. The threaded sleeve is actuated when required by an arm $f$ having manual connection for the operator to move it.

Ball-races and balls $g$ are shown inserted between the sleeve and the adjacent hub $j$ of the drum to diminish the friction under the thrust of the threaded sleeve. When the sleeve is turned backwardly, the drum-cone is retracted from the friction-driver by the usual spring $k$.

It is obvious that the thrust of the threaded sleeve forces the drum and friction-driver against the shoulder $b^2$ upon the shaft, and to prevent such thrust from pushing the bearing $a$ backwardly, a thrust-collar $l$ is fixed upon the shaft outside the bearing $a$ to partly resist such thrust, and the shaft is formed with grooves *m* and the bearing with ribs *n* to fit such grooves, as indicated in Figs. 2 and 3. These two agencies coöperate simultaneously to sustain the thrust of the threaded sleeve *e*, and locks to the shaft itself all the strain which is required to drive the drum.

The means for holding the thrust-collar *l* immovably to the shaft when in its working position, is shown in Figs. 3 to 6 inclusive, and consists of the feathers *o* sunk into suitable key-ways in opposite sides of the extension *b'*, which is made so much smaller than the shaft *b* that the tops of the feathers clear the bore of the drum when retracted from the shaft, as is shown in Fig. 2, where the outer hub of the drum is shown moved over the feathers, and the inner hub of the drum which carries the hollow cone *j*, has still to be moved over the grooves *m* of the shaft; where the ribs between the grooves are flush with the body *b* of the shaft.

The thrust-collar is shown formed with notches *l'* in opposite sides to wholly clear the feathers when moved over the same, as shown in Fig. 5, and is also formed with shallow sockets *o'* which engage the ends of the feathers when the thrust-collar is in its working position shown in Fig. 2.

A loose washer *p* is shown fitted between the thrust-collar and the bearing *a* to diminish the friction, and permit of renewal to compensate for wear and is notched like the thrust-collar to permit removal.

A clutch-collar *q* is shown fitted to slide upon the shaft over the feathers between clutch-teeth *g'* upon the winch and the bearing *a*, and a clutch-shifter *r* is shown mounted in guides *r'* upon the bearing *a* and actuated by a hand-lever *s*. This construction of the clutch-shifter is not claimed herein, but is made the subject of a separate application.

When it is desired to remove the drum from the shaft, the plate *d* and the winch *c* are removed from the overhung portion *b'* of the shaft. The caps of the bearings *a*, *a'*, are then removed to lift the drum and its shaft from the bearings. This removes the clutch-shifter *r* from engagement with the clutch-collar *q*, which can also be removed from the shaft-portion *b'*.

When the shaft is removed from the bearings, the thrust-collar *l* can be slipped from its engagement with the ends of the feathers, and the collar turned ninety degrees, to bring the notches *l'* in line with the feathers, when the thrust-collar can then be slid from the shaft, as indicated in Fig. 6. The thrust-sleeve and hub can then be slipped from the shaft over the reduced portion *b'* without removing the feathers from the shaft, and the same is also true of the drum *i*, as indicated in Fig. 2.

The importance of the present improvements will be understood from the fact that the lateral strain upon a winch overhung from a shaft-bearing tends to bend the shaft between the two bearings and thus cause it to cramp in the bore of the drum, producing great friction and cutting of the surfaces, and necessitates the removal of the drum to replace the bushings marked *g'*, which are commonly furnished in the hubs of the drum to facilitate renewal and repairs. Hoisters having such drums and winches are used chiefly in connection with mines and excavations, in situations where the facilities for repairs are very meager, and where tools would not be found to properly remove the feathers from the shaft. For this reason, feathers are often ruined by the efforts to dislodge them in order that the drum may be taken from the shaft; and in other cases it proves necessary to ship the drum and shaft together because the drum is retained in its position by the shoulder $b^2$ at one end of the shaft and the thrust-collar *l* at the other end, which collar could not be released because the feathers could not be removed.

The feathers cannot perform their function permanently unless they are inserted tightly in the seats of the shaft, and by the present invention this can be done in the most effectual manner, as the construction does not require the removal of the feathers under any conditions, but permits the thrust-collar to be held securely by the feathers when in its working position, and also to slip freely over the feathers when turned ninety degrees from its working position, thus permitting the drum and the thrust-screw *e*, *e'*, to be drawn freely from the shaft. Such a relation of the feathers to the drum is secured by reducing the size of the shaft where it extends outside of the bearing, so that the tops of the feathers may clear the inside of the drum-bore when the drum is slipped endwise, as shown in Fig. 2.

Having thus set forth the nature of the invention what is claimed herein is:

1. In a power-hoister, the combination, with a drum-shaft and a drum fitted loosely thereon, of bearings near the ends of the shaft, a winch on the shaft overhung from one of the bearings, removable means for retaining the winch upon the end of the shaft with space between the winch and the bearing with a clutch-collar fitted therein, clutch-teeth upon the adjacent end of the winch to engage such collar, feathers recessed in the shaft to drive the said clutch-collar, and the shaft reduced outside of the bearing sufficiently, when provided with the feathers, to permit the sliding of the drum over the said feathers, to remove it from the shaft when the winch and clutch-collar are separated therefrom.

2. In a power-hoister, the combination with a drum-shaft and a drum fitted loosely thereon, of bearings near the ends of the shaft, a winch on the shaft overhung from one of the bearings, removable means for retaining the winch upon the end of the shaft, with space between the bearing and the winch with a clutch-collar fitted therein, feathers fitted to the shaft in such space with a thrust-collar between the ends of the feathers and the bearing, and notches in the thrust-collar to clear the feathers when it is required to remove the thrust-collar and the drum from the shaft.

3. In a power-hoister, the combination, with a drum-shaft having bearings near its opposite ends, of a shoulder upon the shaft near one of the bearings with a friction-driver fitted against such shoulder, a drum fitted movably to the shaft next the friction-driver, a thrust-collar upon the outside of the opposite bearing, feathers in the shaft holding the thrust-collar normally against the bearing, and a thrust-screw fitted between the said bearing and the end of the drum to press it against the friction-driver, the thrust-collar outside of the bearing having notches to clear the said feathers when it is required to remove the drum and the thrust-screw from the shaft.

4. In a power-hoister, the combination, with a drum-shaft having bearings near its opposite ends, of a shoulder upon the shaft near one of the bearings with a friction-driver fitted against such shoulder, a drum fitted movably to the shaft next the friction-driver, the shaft projecting beyond the opposite bearing and having a winch overhung thereon with space between the same and the said bearing with a clutch-collar fitted therein, clutch-teeth upon the adjacent end of the winch to engage such collar, feathers recessed in the shaft from the inner end of the winch nearly to the said bearing to drive the clutch-collar, means abutting upon the said bearing to force the drum toward the friction-driver, and a thrust-collar fitted between the ends of the feathers and the said bearing to resist such thrust, and having sockets to engage the ends of the feathers and thus rotate with the shaft.

5. In a power-hoister, the combination, with a drum-shaft and a drum fitted loosely thereon, of bearings near the ends of the shaft, an extension of the shaft outside of one of the bearings of smaller diameter than the body of the shaft, a winch fitted to such smaller portion with space between the winch and the bearing with a clutch-collar fitted therein, clutch-teeth upon the adjacent end of the winch to engage such collar, feathers recessed in the shaft in said space to drive the clutch-collar, a thrust-collar fitted between the ends of the feathers and the bearing with notches fitted loosely to the feathers, and the thrust-collar having sockets intermediate to such notches to engage the ends of the feathers when required, annular grooves in the shaft and corresponding grooves and ribs in the said bearing to engage the same, the thrust upon the shaft being supported partly by such ribs and grooves and partly by the thrust-collar, and the ribs and feathers being proportioned to clear the bore of the drum to facilitate the removal of the same from the shaft.

In testimony whereof I have hereunto set my hand.

ASHER LAMBERT.

Copies of this patent may be obtained for five cents each, by addressing the "Commissioner of Patents, Washington, D. C."